United States Patent

Kazlauskas

[15] 3,688,069
[45] Aug. 29, 1972

[54] WELDING HEAD APPARATUS
[72] Inventor: Gasparas Kazlauskas, 10707 Camarillo St., North Hollywood, Calif. 91605
[22] Filed: Nov. 23, 1970
[21] Appl. No.: 92,023

[52] U.S. Cl. .............................................. 219/60 A
[51] Int. Cl. .............................................. B23k 9/12
[58] Field of Search.219/60 R, 60 A, 61, 124, 125 R, 219/137

[56] References Cited

UNITED STATES PATENTS

| | | |
|---|---|---|
| 3,230,340 | 1/1966 | Glatthorn et al. .........219/125 |
| 2,721,248 | 10/1955 | Kirkpatrick ...............219/125 |
| 2,894,111 | 7/1959 | McNutt .......................219/60 |
| 3,179,781 | 4/1965 | Ross et al. ....................219/60 |
| 3,395,262 | 7/1968 | Kazlauskas ..................219/60 |
| 3,400,237 | 9/1968 | Kazlauskas ..................219/60 |
| 3,461,265 | 8/1969 | Spiro .....................219/125 X |

Primary Examiner—J. V. Truhe
Assistant Examiner—L. A. Schutzman
Attorney—Robert E. Geauque

[57] ABSTRACT

A welding head, to effect welding of cylindrical tubes wherein the head includes a fixed housing and a rotatable housing, a welding electrode contained wherein the rotatable housing, both the fixed housing and rotatable housing having alignable openings through the wall structure of each to permit entry and removal of the tube, passage structure located within both the fixed housing and rotatable housing to continuously supply inert gas to the molten puddle at the welding location, the passage structure effecting continuous application of the gas to the molten puddle during rotational movement of the rotatable housing with respect to the fixed housing.

3 Claims, 16 Drawing Figures

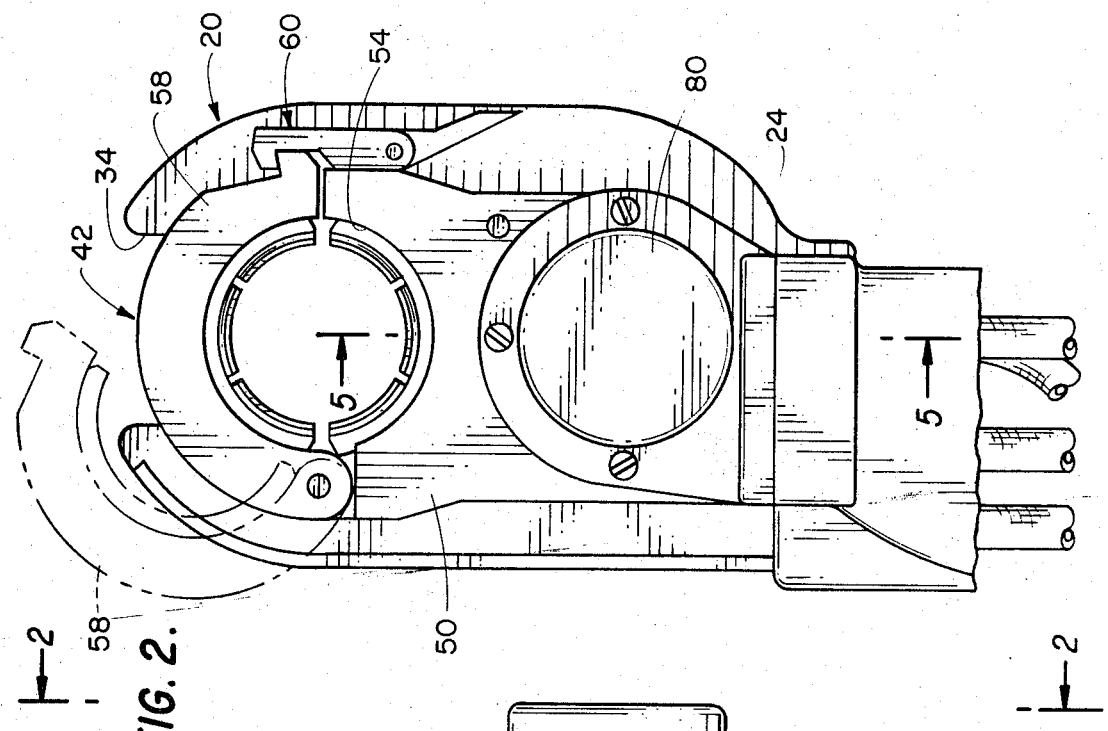
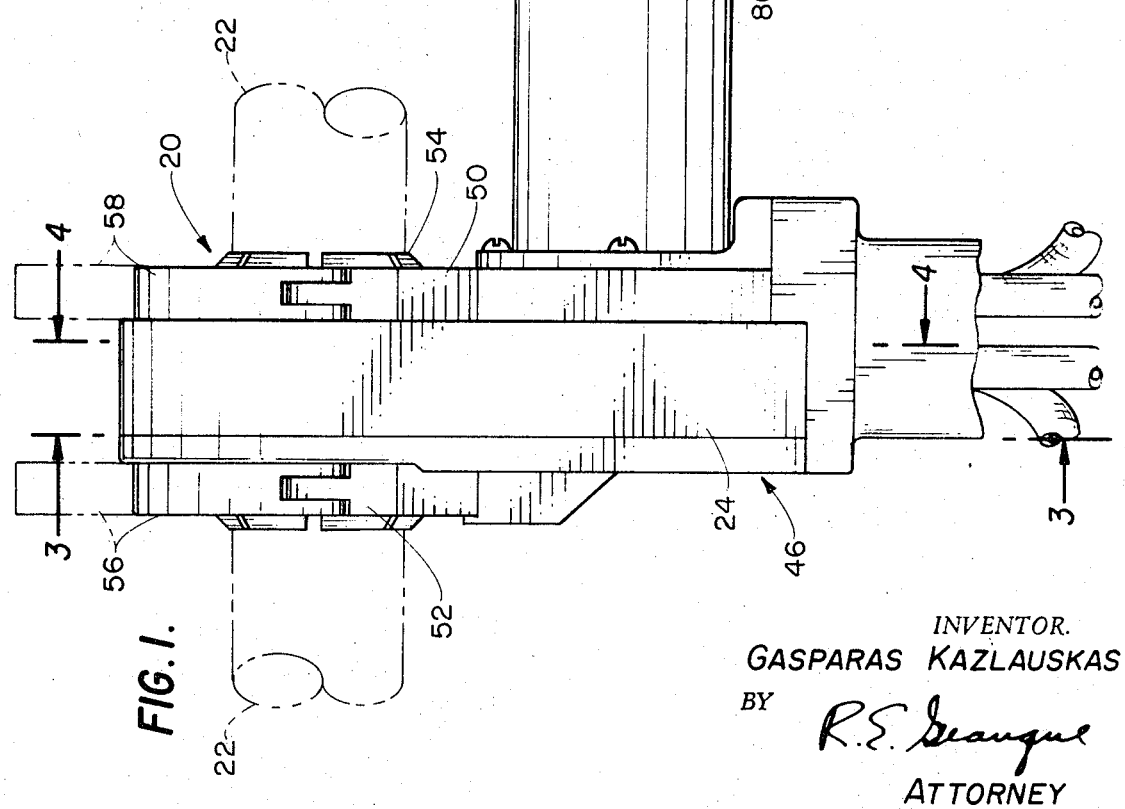

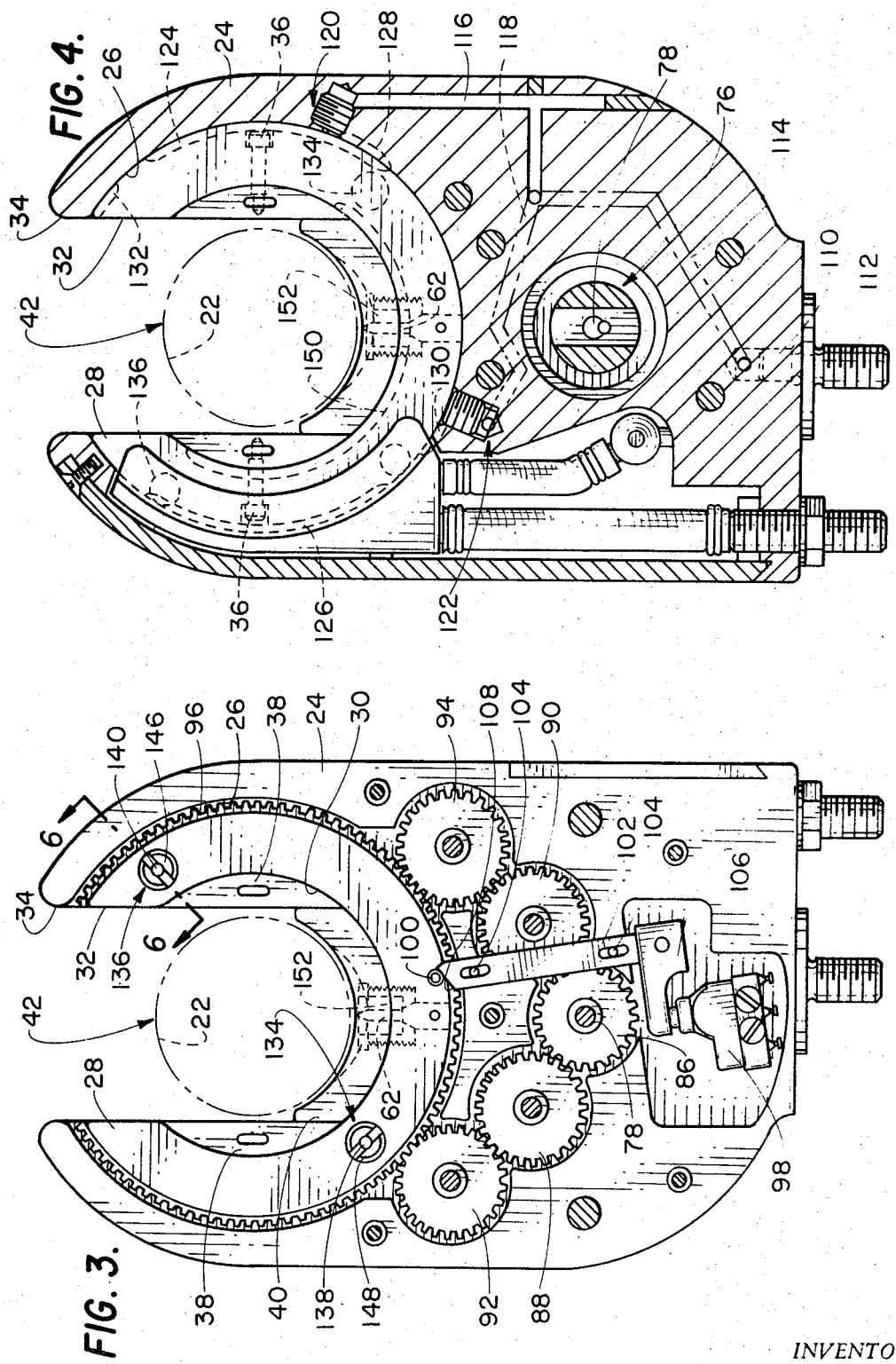

INVENTOR.
GASPARAS KAZLAUSKAS
BY R. E. Geauque
ATTORNEY

INVENTOR.
GASPARAS KAZLAUSKAS
BY R. E. Geangue
ATTORNEY

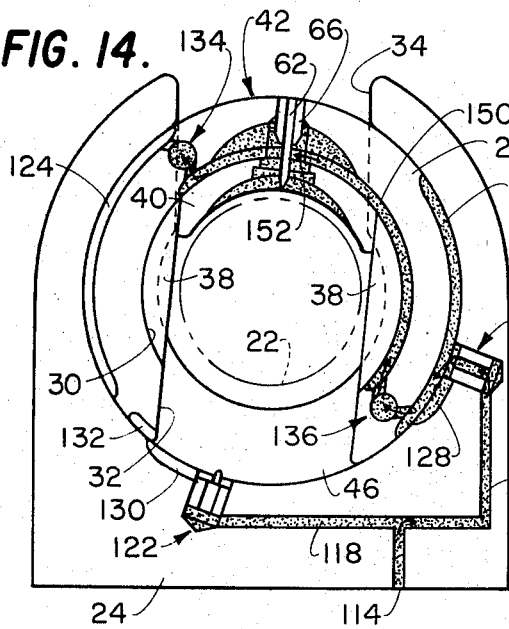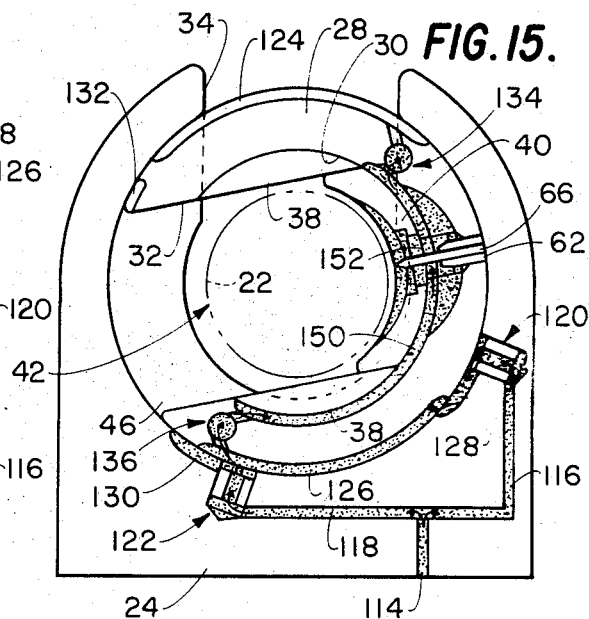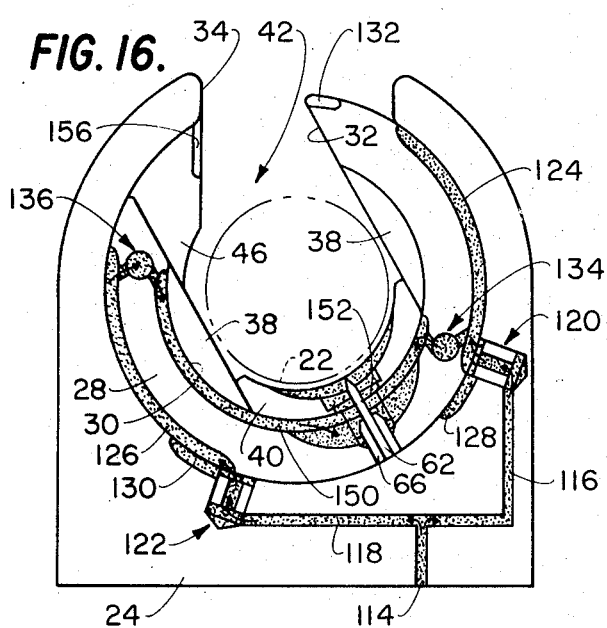

WELDING HEAD APPARATUS

BACKGROUND OF THE INVENTION

The field of this invention relates to the welding of separate metallic cylindrical tubular elements by the gas shielded tungsten electrode arc welding process. More particularly, the field of this invention contemplates an apparatus for automatic gas tungsten arc welding along a circumferential path in tubular structures, and specifically an improved apparatus over the structure shown and described in U.S. Pat. No. 3,400,237, by G. Kazlauskas. The apparatus of this invention is to employ a welding technique similar to the aforesaid patent, and reference may be had to the aforesaid patent for details of the welding technique.

Previous there have been welding heads formed of a split type head structure. In order to locate the tube within the head for welding, it is necessary to axially position the tube which is to be welded within the welding aperture within the head. It is normally necessary to disassemble the welding head to effect tube insertion. Besides the time lost in accomplishing such disassembly, frequently the gear element may be physically dropped because the gear is at an elevated temperature after use. Such gear elements are highly precision formed and are easily damaged. Damaged gear elements require replacement which is quite costly. Further it is extremely difficult to adequately cool the type of welding head which must be disassembled.

It would be most desirable to design a welding head which did not require disassembly of the welding head to effect the welding procedure.

SUMMARY OF THE INVENTION

The welding head of this invention provides for a gear driven rotatable housing located within a fixed housing. The rotatable housing includes a substantially U-shaped slot through the wall structure of the rotatable housing. The welding electrode is to be located adjacent the apex of the U-shaped slot completely surrounded by the rotatable housing. The tubular element to be welded is adapted to be located within the U-shaped slot and to be located directly adjacent the welding electrode. An opening within the fixed housing is formed of substantially the same width as the U-shaped slot. The opening within the fixed housing is formed of substantially the same width as the U-shaped slot. The opening within the fixed housing is to be alignable with the U-shaped slot of the rotatable housing, thereby permitting access of the tubular element into the U-shaped slot of the rotatable housing.

Inert gas is to be supplied about the welding electrode during the welding procedure providing inert atmosphere in weld area. A valve controlled gas passage structure is formed within the fixed housing and the rotatable housing to supply inert gas to the welding area about the electrode. The valve controlled gas passage structure, during rotation of the rotatable housing within the fixed housing, is to substantially preclude leakage of the gas into the U-shaped opening, but insures that the gas is only permitted to exit through the chamber adjacent the welding electrode.

BRIEF DESCRIPTION OF THE DRAWINGS

FIG. 1 is an overall view of the welding head of this invention taken along the longitudinal direction of the tubular element to be welded;

FIG. 2 is an overall side view of the welding head of this invention taken along line 2—2 of FIG. 1;

FIG. 3 is a sectional view through the welding head of this invention taken along line 3—3 of FIG. 1;

FIG. 4 is a sectional view through the welding head of this invention taken along line 4—4 of FIG. 1;

FIG. 14 is a view similar to FIG. 13 but showing the rotatable housing rotated from the position of FIG. 13;

FIG. 15 is a view similar to FIG. 8 but showing the rotatable housing rotated from the position of FIG. 14; and FIG. 16 is a view similar to FIG. 8 but showing the rotatable housing rotated with respect to FIG. 15.

DETAILED DESCRIPTION OF THE SHOWN EMBODIMENT

Figure 5:
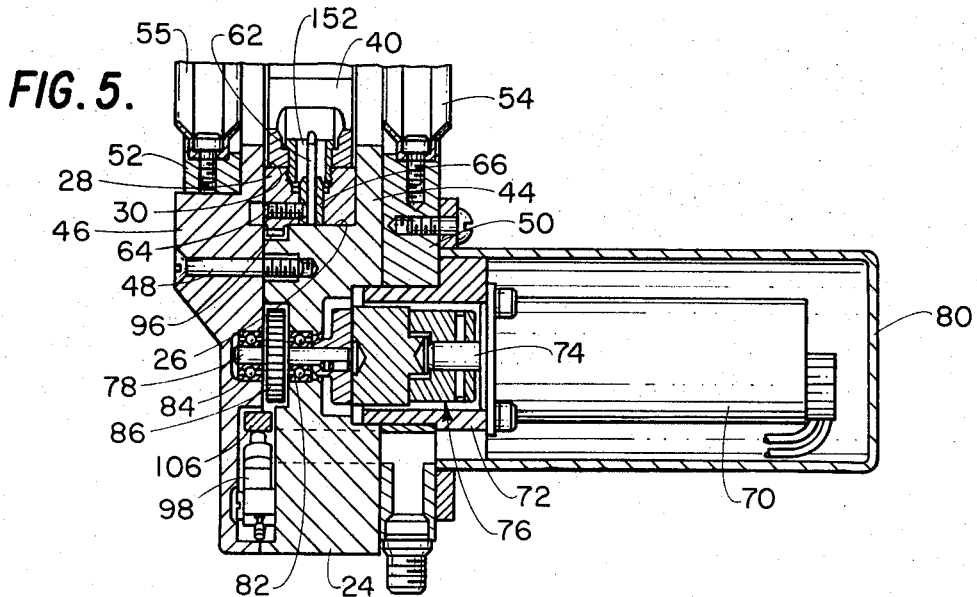
FIG. 5 is a sectional view through a portion of the welding head of this invention taken along line 5—5 of FIG. 2.
Figure 6:
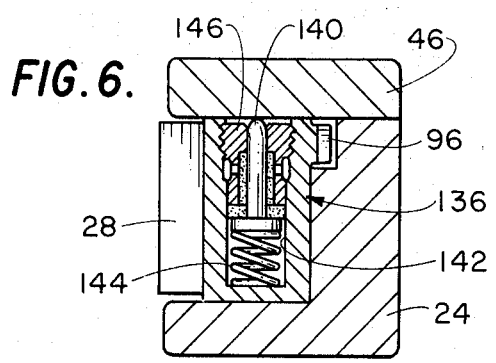
FIG. 6 is a fragmentary sectional view through a valve within the gas passage way structure included within this invention, taken along line 6—6 of FIG. 3.
Figure 7:
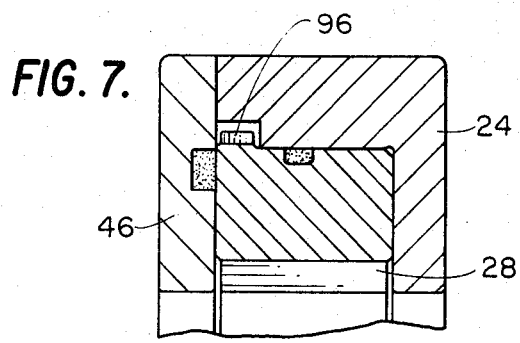
FIG. 7 is a fragmentary sectional view through both the fixed housing and rotatable housing of the welding head of this invention taken along line 7—7 of FIG. 12.
Figure 10:
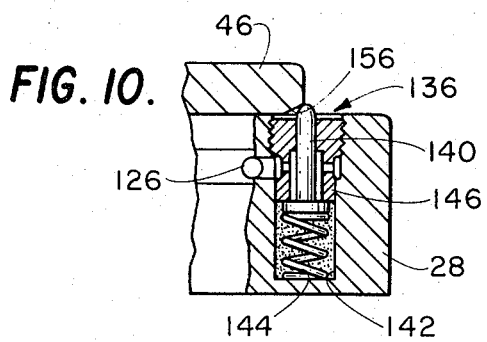
FIG. 10 is a fragmentary cross sectional view of a valve employed within the gas passage structure taken along 10—10 of FIG. 9.
Figure 13:
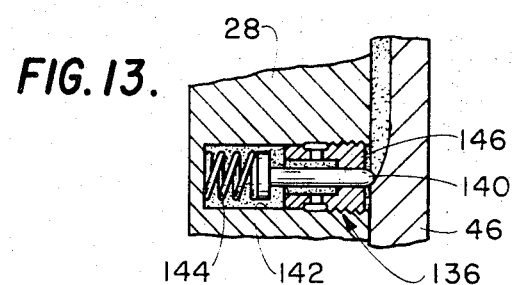
FIG. 13 is a fragmentary sectional view of the valve of FIG. 10 but showing the valve in the open position taken along line 13—13 of FIG. 12.

Referring particularly to the drawings, there is shown the welding head 20 of this invention which is adapted to weld together separate elements of cylindrical tubing 22. Welding head 20 includes a main fixed housing 24 which has a cavity 26 therein. Rotatably supported within the cavity 26 is a rotatable gear housing 28. A circular shaped opening 30 is formed longitudinally within the rotatable gear housing 28. A transverse opening 32 is formed through the wall structure of rotatable housing 28 and communicates with longitudinal opening 30. A similar transverse opening 34 is formed through the wall structure of the fixed housing 24. The width of the transverse openings 32 and 34 is to be substantially identical. Also, openings 32 and 34 are to be alignable as shown in FIG. 3 of the drawings, so as to permit access of cylindrical tubing 22 within the longitudinal opening 30.

Secured by bolts 36 within the longitudinal opening 30 to the rotatable housing 28 are side elements 38. Side elements 38 are formed in a cross sectional shape of a segment of a circle. It is the function of the side elements 38 to form substantially parallel side walls with respect to the transverse opening 32. An apex element 40 is located between the side elements 38 and forms the closed end of the resulting U-shaped opening 42. The resulting U-shaped opening 42 is formed by means of the spaced apart side elements 38 and apex element 40. The apex element 40 is fixedly secured to the rotatable gear housing 28 by means of conventional fastening means (not shown). The rotatable housing 28 is prevented from longitudinal movement within opening 26 by means of a forward flange 44, which is integrally secured to the fixed housing 24, and prevented from axial movement in the aft direction by means of a plate 46. Plate 46 is secured by bolts 48 to the fixed housing 24. Secured to fixed housing 24 is an attaching plate 50.

Fixedly secured to plate 46 is a clamp housing 52. A clamp element 54 is fixedly secured to the attaching plate 50. A clamp element 55 is similarly fixedly secured to the clamp housing 52. Pivotally mounted with respect to the clamp housing 52 is a movable element 56. Similarly mounted upon attaching plate 50 is a movable element 58. Element 58 is capable of being pivotally moved adjacent clamp ring element 54 and effecting a retaining action upon the cylindrical tubing 22. A pivotal toggle type latch assembly 60 is employed to retain elements 58 and 54 in the adjacently located position. In a similar manner elements 56 and 55 are movable adjacent one another to effect a holding retaining action against the other element of the tubing 22. A similar toggle type latch assembly (not shown) is employed to maintain the position of elements 56 and 52.

The separate sections of the tubing 22 are to be located so that the gap between the elements is directly adjacent the electrode 62. The electrode 62 is fixedly mounted by set screw 64 and pivoted by bushing 66. Electric current from a source (not shown) is to be selectively applied to the electrode 62. For a more detailed operation of the welding procedure of the welding head of this invention, as well as the associated functions such as cooling, and also the details of construction of the welding head, reference may be had in particular to U.S. Pat. No. 3,400,237, by G. Kazlauskas.

It is to be understood that the welding procedure as well as the specific details of construction of the welding head form no specific part of this invention. The welding head 20 of this invention depends primarily upon the designing of the welding head so as to permit transverse access of the tubing 22 into the welding head and the associated gas passage structure to continuously supply inert gas to the molten puddle at the welding location.

An electric motor 70 is secured to mounting housing 72. Mounting housing 72 is fixedly positioned within attaching plate 50 and to a portion of the fixed housing 24. The drive shaft 74 of the motor 70 operates through a drive shaft connection assembly 76 which is electrically insulated, to effect rotation of shaft 78. A protective housing 80 is secured about motor 70 to the attaching plate 50. Shaft 78 is low frictionally rotatably supported by means of bearings 82 and 84. A drive gear 86 is secured to shaft 78 and located between bearings 82 and 84. Drive gear 86 is operatively connected to spaced apart idler gears 88 and 90. Each of the idler gears 88 and 90 are low frictionally supported by means of bearings (not shown) within the fixed housing 24 and plate 46. Idler gear 88 effects rotation of a similarly mounted driven gear 92. Idler gear 90 effects rotation of a similarly mounted driven gear 94. Each of the driven gears 92 and 94 are connected to a ring gear 96, which is integrally formed upon the rotatable housing 28. The reason for the dual driving connection by driven gears 92 and 94 upon the ring gear 96 is so, that upon transverse opening 32 communicating with one of the driven gears 92 or 94, the other driven gear is maintaining rotation of the rotatable housing 28.

Upon activation of motor 70, the rotatable housing 28 is continuously rotated an unlimited number of revolutions. The stopped position is always so that the openings 32 and 34 are in alignment with each other, thereby permitting access and removal of the cylindrical tubing 22. Upon activation of motor 70, the revolving of housing 28 is effected, microswitch 98 is activated causing deactivation of motor 70. Microswitch 98 is mounted upon the fixed housing 24 within a cavity formed by means of the fixed housing 24 and the plate 46. A cam 100 is fixedly located in a particular position upon the rotatable housing 28. Cam 100 is to be contactable with a slidingly mounted arm 102. Arm 102 is longitudinally movable by means of pins 104 with respect to the fixed housing 24. The free end of arm 102 is connected to an actuating arm 106. The actuating arm 106 and 102 are normally biased to the position as to not permit activation of microswitch 98. Upon the rotatable housing 28 rotating a single revolution with respect to fixed housing 24, the cam 100 comes into contact with cam surface 108 of the arm 102. As a result, the arm 102 and the actuating arm 106 are moved in a sliding manner upon pins 104 against the action of the bias. Upon such being moved sufficiently, actuating arm 106 causes activation of microswitch 98, which can result in deactivation of motor 70. In many welding situations the welding cycle may be preset at a plurality of revolutions. The switch 98 will deactivate motor 70 only after completion of welding cycle. Further rotation of rotatable housing 28 is then precluded until manual activation of motor 70 then occurs.

Formed within fixed housing 24 is a gas inlet port 110. Inert gas from a source (not shown) is to be supplied through fitting 112 into the inlet port 110. Main gas conduit 114 connects into branch conduits 116 and 118. Branch conduit 116 can be opened and closed by means of a first poppet value assembly 120. Branch conduit 118 can be selectively opened and closed by means of a second poppet valve assembly 122. The stem of each of the poppet valve assemblies 120 and 122 is adapted to be in contactual relationship with the rotatable housing 28. With such occurring, the poppet valve assemblies 120 and 122 are in the open position thereby permitting conducting of gas through said assemblies. When either of the valve stems of the valve assemblies 120 and 122 is in the area of the transverse opening 32, the valve assemblies 120 and 122 are in the closed position thereby not permitting conducting of gas therethrough.

Formed about the perimeter of the rotatable housing 28 are gas passageways 124 and 126. With either of the poppet valve assemblies 120 and 122 in a communicating relationship with passageways 124 and 126, gas is permitted to conduct through the respective valve assemblies 120 and 122 into the passageways 124 and 126. Short passageways 128 and 130 are formed within fixed housing 24 in the area of the cavity 26. Passageway 128 is located directly adjacent first poppet valve assembly 120 with the passageway 130 being located adjacent the second poppet valve assembly 122. A groove 132 is formed within the rotatable housing 28 adjacent one side of transverse opening 32. The function of the groove 132 is to permit closing of the first poppet valve assembly 120 prior to movement of the rotatable housing 28 past the valve assembly 120.

The gas within passageway 124 is communicated to a third poppet valve assembly 134, which is located within the rotatable housing 28. The gas within passageway 126 is similarly communicated to a fourth poppet valve assembly, which is mounted within the rotatable housing 28. Each of the poppet valve assemblies 134 and 136 are identical in construction with the valve assembly 134 including a valve stem 138. The valve assembly 136 similarly includes a valve stem 140. Valve stem 140 is mounted within a chamber 142 within which is located a spring 144. Spring 144 constantly biases valve stem 140 into abutting relationship with a valve plug 146, thereby normally preventing conducting of gas therethrough. Poppet valve assembly 134 has a similar valve plug 148 and also a similar spring (not shown) and chamber (not shown). Both the poppet valve assemblies 134 and 136 permit conductance of gas into substantially semicylindrical passageway 150 which is formed within the rotatable housing 28 adjacent opening 30. Passageway 150 is connected to the annular chamber 152 which surrounds electrode 62. From the annular chamber 152, the inert gas is permitted to exit into the U-shaped opening 42 about welding electrode 62, thereby providing an inert gas welding environment.

Each of the stems 138 and 140 of the valve assemblies 134 and 136, respectively, are capable of cooperating with a groove 151 formed within plate 46. The function of the groove 151 will be described in the following operation of the welding head 20 of this invention.

Figure 8:
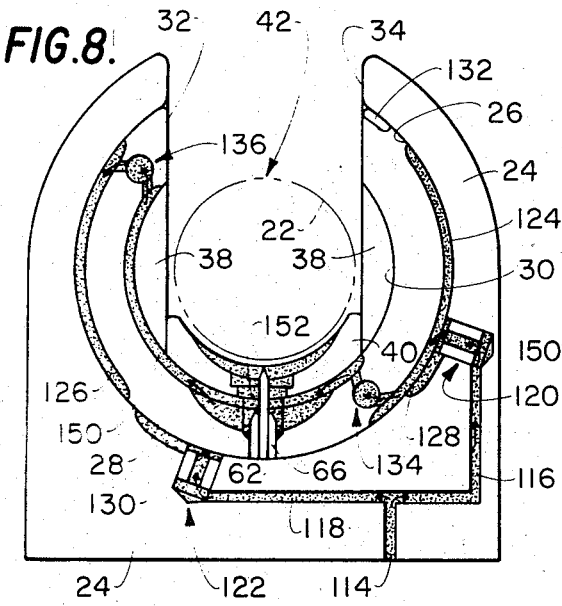
FIG. 8 is a schematic view of the welding head structure of this invention showing in detail the gas passage structure with the slot of the rotatable housing being aligned with the opening in the fixed housing.

The operation of the welding head apparatus of this invention is as follows: It will be presumed that the rotatable housing 28 and the fixed housing 24 are in the position as shown in FIG. 8 of the drawings, wherein transverse openings 32 and 34 are in substantial alignment. It will also be presumed that it is desired to then place tubular element 22 within the U-shaped opening 42. The operator then moves the respective latching assemblies of the movable elements 56 and 58 to the non-latched position and effects sufficient pivotable movement of the movable elements 56 and 58 to permit unhindered entry of the tubing 22 to within the U-shaped opening 42. The tubing is then moved into substantial adjacent relationship with apex element 40 and into contactual relationship with clamp ring elements 55 and 54. The movable elements 56 and 58 are then moved about the tubing 22 and their respective latching assemblies are moved to the latched position. The operator then effects manual activation of motor 70. Also, simultaneously with the activation of motor 70, welding current is being supplied to electrode 62 and inert gas is being supplied to within conduit 114. The motor 70 then causes movement of the rotatable housing 28 with respect to the fixed housing 24 until cam 100 comes into contact with cam surface 108. Arms 102 and 106 are then moved to effect deactivation of motor 70 through microswitch 98. During the entire movement, the welding current to the electrode 62 is being maintained as is also the continuous supply of inert gas to conduit 114.

The conductance of gas through the gas passageway structure is as follows: The inert gas is being supplied from conduit 114 continuously into branch conduits 116 and 118 and to their respective poppet valve assemblies 120 and 122. With the welding head 20 in the zero position as shown in FIG. 8 of the drawings both the poppet valve assemblies 120 and 122 are in the open position thereby permitting conducting of gas from poppet valve 120 into the passageways 128 and 124, and from poppet valve 122 into passageway 130. Passageway 130 is closed off by means of the rotatable housing 28. Passageway 124 is connected to the third poppet valve assembly, which is in the open position thereby permitting conductance of gas into passageway 150 and into annular chamber 152, past electrode 62 and into the U-shaped groove 42. Also, the gas is permitted to pass from groove 150 through fourth poppet valve assembly 136, which is in the open position, and into passageway 126. However, passageway 126 is also closed with respect to the rotatable housing 28.

Figure 9:
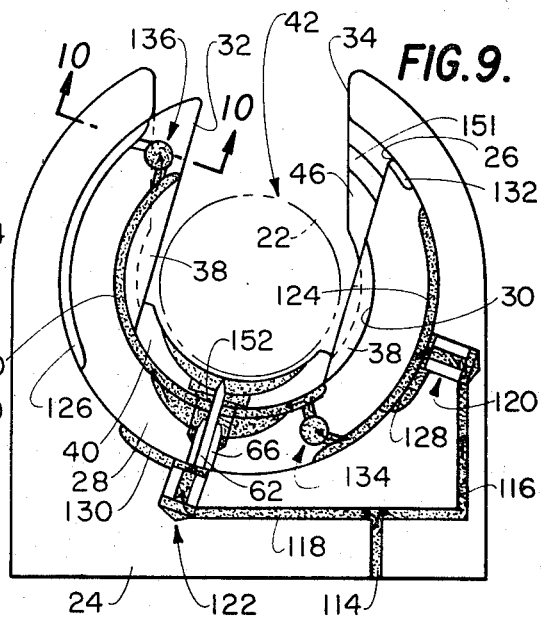
FIG. 9 is a view similar to FIG. 8 but showing the rotatable housing rotated with respect to the fixed housing.

After movement of the rotatable housing as shown in FIG. 9 of the drawings, the only change which has occurred is that the valve stem 140 of the fourth poppet valve assembly 136 has moved out of contactual relationship with the plate 46, thereby causing a closing of the valve assembly 136 and not permitting conductance of gas from passageway 150 into passageway 126. The chamfer 156, formed on the plate 46, insures movement of the valve stem 140 to the closed position prior to communication of passageway 126 with the U-shaped opening 42, thereby preventing transmission of gas therebetween.

Figure 11:
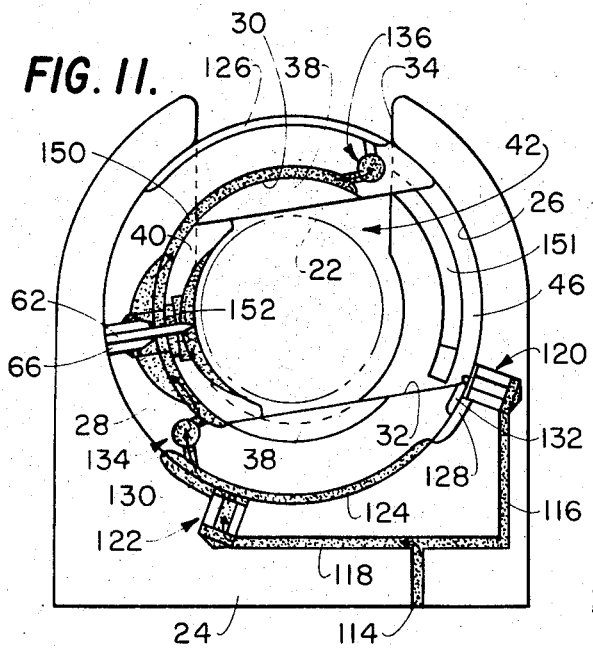
FIG. 11 is a view similar to FIG. 8 but showing the rotatable housing rotated from the position of FIG. 9.

As the rotatable housing 28 continues to move to the position shown in FIG. 11, the poppet valve assembly 136 is still in the closed position so as to prevent leakage of gas therethrough. The first poppet valve 120 has now been moved to the closed position to prevent leakage of gas directly from the branch conduit 116 into the U-shaped groove 42. Although poppet valve assembly 120 has been closed, gas is still being transmitted through poppet valve assembly 122 and through the third poppet valve assembly 134 to annular chamber 152. It is to be noted that the stem of the first poppet valve assembly 120 first comes into communication with groove 132 which causes the valve 120 to be closed prior to communication with the U-shaped slot 42. This is necessary so as to prevent the certain amount of leakage which would inherently occur if the valve assembly 120 was permitted to be closed upon reaching the U-shaped groove 42.

Figure 12:
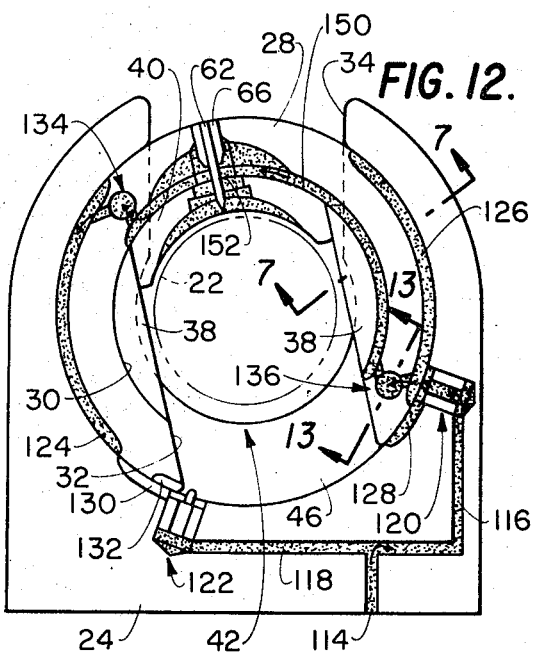
FIG. 12 is a view similar to FIG. 11 but showing the rotatable housing rotated further with respect to the fixed housing.

Upon continual rotation of the rotatable housing 28 as shown in FIG. 12 of the drawings, the changes which occur are the opening of the fourth poppet valve assembly 136 and the closing of the second poppet valve assembly 122. The valve stem 140 of the poppet valve assembly 136, during the movement has come into contact with groove 151. The purpose of groove 151 is to prevent opening of poppet valve assembly 136 until the entire passageway 126 is encased between the rotatable housing 28 and the fixed housing 24. Such is necessary so as to prevent escape of gas from passageway 150 into passageway 126 and through transverse opening 34. Upon passageway 126 being completely confined between the rotatable housing 28 and the fixed housing 24, poppet valve assembly 120 is then opened. Simultaneously therewith, poppet valve assembly 122 has been moved to the closed position since the valve stem thereof has come into cooperation with groove 132. The function of the passageway 130 is to permit conducting of gas into passageway 124 for a small amount of movement of such past the valve assembly 122. The inert gas is now then being supplied only through valve assembly 120, through valve assembly 136 and into annular passage 152.

Upon continual movement of the rotatable housing 28, to the position as shown in FIG. 14 of the drawings, valve assembly 134 is moved to the closed position by coming into contact with chamfer 156 of the plate 46. This arrangement is basically similar to the arrangement previously discussed in relation to FIG. 9 of the drawings.

Continual movement to the position as shown in FIG. 15 of the drawings causes valve assembly 122 to be moved to the open position. In this particular position, gas is now being supplied from both conduits 116 and 118, through their respective valve assemblies 120 and 122 and into the passageway 126. This occurs only during a few degrees of movement of the rotatable housing 28. Such an arrangement is found to be desirable so as to insure that gas is being continuously supplied through annular passage 152 at all times during rotation of rotatable housing 28.

This rotational movement of the rotatable housing 28 continues. In the position as shown in FIG. 16 of the drawings, passageway 126 no longer communicates with passageway 128 but now is in communication with passageway 130. However, passageway 124 is now beginning to communicate with passageway 128. Again, inert gas is being supplied to annular chamber 152 through both valve assemblies 134 and 136.

Upon an additional movement to the position shown in FIG. 8 of the drawings, passageway 126 is now no longer capable of communicating with passageway 130. However, as previously stated, inert gas is being supplied through valve assembly 134 into annular chamber 152.

What is claimed is:

1. A welding head for welding separated sections of cylindrical tubing comprising;
    a fixed housing having a first longitudinal aperture therein having an interior annular wall;
    a rotatable housing being rotatably mounted within said first aperture, said rotatable housing having an exterior annular wall, said interior wall of said fixed housing and said exterior wall of said movable housing being in an abutting relationship, said rotatable housing having a second longitudinal aperture therein, said second longitudinal aperture to be capable of being located to the attached ends of said tubing;
    means to permit transverse access of said tubing into said second aperture;
    said means comprises a first opening within the wall structure of said fixed housing and a second opening within the wall structure of said rotatable housing, said first and second openings being alignable to permit access of said tubing;
    a welding electrode mounted within said rotatable housing and communicating with said second longitudinal opening, a chamber located adjacent said electrode to effect supplying of an inert gas to the welding area; and
    gas passage structure formed in both said interior wall of said fixed housing and said exterior wall of said rotatable housing to facilitate the supplying of inert gas from an external source to said chamber,
    said gas passage structure including first passageways formed within said fixed housing and second passageways formed within said rotatable housing, a first pair of valves circumferentially spaced apart and connected to said first passageways comprising means for controlling, the conducting of gas through said first passageways located within said fixed housing, a second pair of valves circumferentially spaced apart and connected to said second passageways comprising means for controlling the conducting of gas through said second passageways,
    said first pair of valves comprising means closable when directly aligned with said second opening, said second pair of valves comprising means closable when directly aligned with said first opening.

2. A welding head as defined in claim 1 wherein:
    said second valves remaining closed upon movement a predetermined distance past said first opening.

3. In combination with a cylindrical tubular structure upon which it is desired to effect a circumferential weld, a welding head apparatus wherein:
    said welding head apparatus including means to permit transverse access of said tubular structure within said welding head apparatus;
    said welding head apparatus includes a fixed housing and a rotatable housing, said rotatable housing being rotatingly supported within said fixed housing, said rotatable housing having an exterior annular wall which abuts an interior annular wall of said fixed housing;
    said means comprises a first opening within the wall structure of said fixed housing and a second opening within the wall structure of said rotatable housing, said first and second openings being alignable to permit access of said tubular structure;
    a welding electrode mounted within said rotatable housing and being located directly adjacent said tubular structure with such positioned within said welding head apparatus;
    a chamber located adjacent said electrode to effect supplying of an inert gas to the welding area; and
    gas passage structure formed in both said interior wall of said fixed housing and said exterior wall of said rotatable housing to facilitate the supplying of inert gas from an external source to said chamber, said gas passage structure including first passageways formed within said fixed housing and second passageways formed within said rotatable housing, a first pair of valves circumferentially spaced apart and connected to said first passageways comprising means for controlling the conducting of gas through said first passageways located within said fixed housing, a second pair of valves circumferentially spaced apart and connected to said second passageways comprising means for controlling the conducting of gas through said second passageways, said first pair of valves comprising means closable when directly aligned with said second opening, said second pair of valves comprising means closable when directly aligned with said first opening.

* * * * *